UNITED STATES PATENT OFFICE.

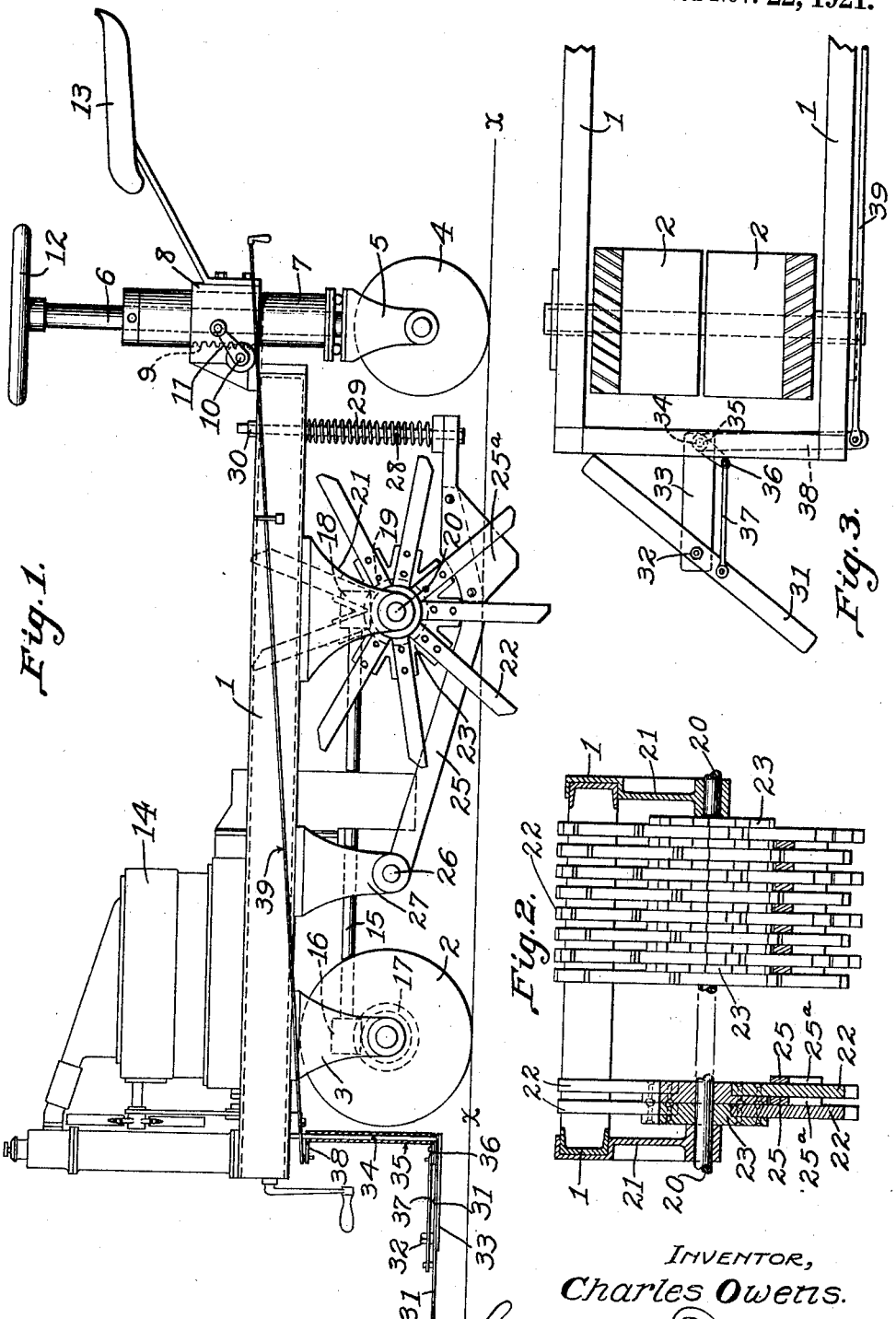
C. OWENS.
AGRICULTURAL IMPLEMENT.
APPLICATION FILED SEPT. 9, 1920.
1,397,599.
Patented Nov. 22, 1921.
INVENTOR,
Charles Owens.

CHARLES OWENS, OF CHATTANOOGA, TENNESSEE.

AGRICULTURAL IMPLEMENT.

1,397,599. Specification of Letters Patent. Patented Nov. 22, 1921.

Application filed September 9, 1920. Serial No. 409,084.

*To all whom it may concern:*

Be it known that I, CHARLES OWENS, a citizen of the United States, and resident of Chattanooga, Tennessee, have invented certain new and useful Improvements in Agricultural Implements, of which the following is a specification.

The invention relates to an agricultural implement designed to pulverize the soil and to cut the humus and commingle it with the pulverized soil.

In the accompanying drawings:

Figure 1 is a side elevation of an apparatus embodying my invention.

Fig. 2 is a cross-sectional view through a portion of the frame showing a few of the pulverizing knives and the knives of the grid which coöperate therewith.

Fig. 3 is a detail plan view.

The apparatus includes a frame 1 of any suitable construction with forward wheels or drums 2, the shaft of which is journaled in hangers 3 and there is a rear wheel 4 journaled in hangers 5 which are carried by a stem 6 having a bearing in a post 7 which in turn has a bearing in a bracket 8 secured to the frame. The post 7 may be adjusted vertically by means of a rack and pinion, the rack being indicated at 9 and the shaft of the pinion at 10. This shaft may be turned by a hand lever 11 to raise or lower the post and thus adjust the rear wheel 4 vertically. This rear wheel may turn to different positions for steering and for this purpose its rod or post 6 is provided with a steering wheel 12 within reach of the driver who occupies seat 13. The implement is self-propelled, the engine being indicated at 14, and power is transmitted therefrom through any suitable means to a shaft 15, which has a worm 16 meshing with a worm wheel 17 on the shaft of the forward drums or traction wheels 2.

The shaft at its rear end is provided with a worm 18 meshing with a worm wheel 19 on a shaft 20 mounted in suitable hangers 21 and this shaft carries a plurality of sets of knives 22 which radiate from a central hub or carrying member 23 mounted on the shaft 20. The knives of each set are in the same plane transversely of the shaft 20 and the different sets are slightly spaced apart so as to work between the members 25 of a grid. These members have a pivotal supporting connection with a cross rod 26 supported in hangers 27 and at their rear ends the grid members are supported by rods 28, preferably two in number, only one of which is shown, and there is a spring 29 surrounding each rod bearing at its upper end against the frame and at its lower end against the bar member so that this is pressed downwardly but is adapted to yield upwardly.

The grid members may be adjusted by nuts, one of which is shown at 30 on the screw-threaded upper end of the hanger rod 28.

Each grid has a depending portion 25$^a$ adapted to enter the soil a number of inches, the ground line being indicated at $x$—$x$, Fig. 1. The forward edge of the depending portions of the grid member is inclined and serves as a cutter to cut through the soil and also as a companion cutter for the radiating and revolving cutting knives 22 which are of such length as to enter the soil for a considerable depth and cut it and pulverize the soil and cut the humus and mix it with the pulverized soil.

At the front of the machine I provide means for insuring that the growth at the top of the soil will be laid down so that the cutting and pulverizing knives 22 will effectually cut this surface growth or humus and cause it to mix with the pulverized soil to a considerable depth. For this purpose I provide a member 31 in the form of a bar, rod or blade, which is located in advance of the front traction wheels 2 but in line therewith. This bar is pivotally mounted at 32 intermediate of its length to a bracket 33 carried by the lower end of a support 34 in the form of a rod or bar which is connected with and depends from the frame in any suitable way. Surrounding this supporting bar there is a sleeve 35 having an arm 36 at its lower end connected by a link 37 with the bar or rod 31 before mentioned and this sleeve has an arm 38 at its upper end connected by a rod 39 to any suitable handle which may be manipulated by the driver for operating the connections described and thus the rod or bar 31, which may be termed a leveling bar, can be set at its inclined positions in relation to the direction of travel or longitudinal axis of the implement and as this leveling bar sets close to the top of the soil, it will cause the surface growth such as grasses, weeds or the like to be laid down in a direction generally transverse to the line of travel of the implement and in position to be borne upon by the front roller 2 which will press this growth close to the earth to prevent it from recovering its normal position after the rollers pass it and thus it will be in condition to be severed by the rotating knives 22 and mixed with the soil which is pulverized by the said knives.

It will be understood that without the leveling device which throws the standing growth down laterally, the cutting knives could not perform their functions to their fullest extent because they would simply pass between the standing growth and fail to cut all of it. By throwing the standing growth down in a direction transverse to the line of travel of these cutters and pressing it firmly down by the roller, the grasses or weeds will lie across the path of travel of the cutting knives and thus will be thoroughly cut and thrown down beneath the surface of the soil and mixed with the pulverized portion thereof.

The drawing and description is presented for illustrative purposes and is not to be regarded as restrictive upon the scope of the invention which is defined in the accompanying claims.

It will be noticed that the depending cutting portions of the grid have inclined front and rear edges so that in passing over obstructions, such as stones or the like, the members of the grid will yield and pass these obstructions. It will be further noticed that by adjusting the rear wheel vertically the depth of cut can be regulated.

The forward drum is made in two sections as shown in the plan view and covers the entire space from side to side of the tractor. Each section has ground grippers or cleats near their outer edges, for the purpose principally of enabling the wheels to turn readily. When making a turn, power is applied to one wheel or section only but as this forms no part of my invention, I have not illustrated herein any means for doing this.

The grid members can be mounted as one body with a single spring at the center or one at each side.

The cutting knives are offset or staggered longitudinally of the main cutter member, that is, each succeeding circumferential row has its members out of line with the members of the preceding row so that the general effect is a spiral arrangement of the blades from end to end of the drum or cutter member. This arrangement reduces the chance of stones lodging between the cutting blades and reduces the number of blades engaging the soil at one time.

I claim:

1. In combination in an agricultural implement, a frame, a grid consisting of arms supported at their front ends and a spring for pressing the rear ends down and permitting the grid to yield vertically, and rotary cutters operating between the members of the grid, substantially as described.

2. In combination in an agricultural implement, a frame, a grid consisting of arms supported at their front ends and yieldable vertically, and rotary cutters operating between the members of the grid, the said grid arms being pivoted at their front ends, and spring pressed at their rear ends downwardly, and means for adjusting the position of the rear ends vertically, substantially as described.

3. In combination in an agricultural implement, a frame, rotary cutter members supported thereby, a grid with which the rotary cutters coöperate in pulverizing the soil, and means for varying the depth of cut, comprising a post vertically adjustable and a carrying wheel supported on said post, said post and carrying wheel being in rear of the rotary cutters, substantially as described.

4. In combination in an agricultural implement, a frame, a rotary cutter, a grid to cut into the soil, together with the rotary cutter, a steering wheel at the rear of the frame and behind the rotary cutter, and means for adjusting it vertically, so that the depth of cut may be regulated, substantially as described.

5. In combination in an agricultural implement, a frame, cutting means to cut the top growth and pulverize the soil, and means at the front of the cutting means for laying the surface growth down at an angle to the line of cut, substantially as described.

6. In combination, a frame, cutter means for pulverizing the soil, consisting of a shaft extending across the machine, cutters supported on said shaft to cut in a vertical plane, and means for laying down the surface growth in front of said cutters and across the cutting path thereof, substantially as described.

7. In combination in an agricultural implement, a frame, cutting means to pulverize the soil mounted on the frame, a front carrying roller in front of the cutting means, and means for laying down the surface growth laterally and at an angle to the line of cut, said means being located in front of the front carrying wheels or rollers, so that the surface growth will be pressed down by said roller before the cutting means reaches it, substantially as described.

8. In combination, a frame, rotary cutting means mounted thereon to pulverize the soil, said cutting means revolving in vertical planes and means for laying down the surface growth laterally to extend transversely of the line of cut, said means comprising a member inclined to the direction of movement of the apparatus, to bear on the surface growth and turn it laterally, said cutting means being of lateral extent substantially equal to that of the surface growth laid down, substantially as described.

9. In combination in an agricultural implement, a frame, soil cutting means to pulverize the soil mounted on the frame, and humus cutting means at the rear of the axis of the soil cutting means adjustably mounted on the frame to work in conjunction with the soil cutting means to cut the humus and mix the humus and soil and means for laying down the surface growth laterally and at an angle to the line of cut, said means being located in front of the front carrying wheels so that the surface growth will be pressed down by said rollers before the soil and humus cutting means reaches it, substantially as described.

In testimony whereof I affix my signature.

CHARLES OWENS.